(12) United States Patent
Tomono et al.

(10) Patent No.: US 10,899,269 B2
(45) Date of Patent: Jan. 26, 2021

(54) LAMP CONTROL DEVICE AND LAMP ASSEMBLY

(71) Applicant: KOITO MANUFACTURING CO., LTD., Tokyo (JP)

(72) Inventors: Toshikazu Tomono, Shizuoka (JP); Yasushi Noyori, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/681,238

(22) Filed: Nov. 12, 2019

(65) Prior Publication Data

US 2020/0148096 A1 May 14, 2020

(30) Foreign Application Priority Data

Nov. 13, 2018 (JP) .................. 2018-212868

(51) Int. Cl.
*B60Q 1/14* (2006.01)
(52) U.S. Cl.
CPC ........ *B60Q 1/1415* (2013.01); *B60Q 2400/30* (2013.01)
(58) Field of Classification Search
None
See application file for complete search history.

(56) References Cited

U.S. PATENT DOCUMENTS

| 3,631,441 | A  | * | 12/1971 | Murphy ............... B60Q 11/005 315/136 |
| 7,880,401 | B2 | * | 2/2011  | Kitagawa ............... H05B 45/10 315/247 |
| 8,878,446 | B2 | * | 11/2014 | Laubenstein ...... H05B 41/2883 315/209 R |
| 2004/0004451 | A1 | * | 1/2004 | Ito .......................... H05B 41/38 315/294 |
| 2014/0111087 | A1 | * | 4/2014 | Kurebayashi ............ B60Q 1/04 315/82 |
| 2017/0253173 | A1 |   | 9/2017 | Boudikian et al. |
| 2018/0056853 | A1 | * | 3/2018 | Muramatsu .......... B60Q 1/1415 |

FOREIGN PATENT DOCUMENTS

JP 2017-154735 A 9/2017

* cited by examiner

*Primary Examiner* — Crystal L Hammond
(74) *Attorney, Agent, or Firm* — Osha Bergman Watanabe & Burton LLP

(57) ABSTRACT

A common lamp driving circuit is configured to supply current. A switching circuit is configured to selectively supply the current to either a first lamp or a second lamp that are of different types. A processor is configured to control the switching circuit such that a state in which the current is supplied to the first lamp and a state in which the current is supplied to the second lamp are repeated.

10 Claims, 4 Drawing Sheets

LAMP CONTROL DEVICE AND LAMP ASSEMBLY

TECHNICAL FIELD

The presently disclosed subject matter relates to a lamp control device for controlling on/off operations of a lamp adapted to be mounted on a vehicle. The presently disclosed subject matter also relates to a lamp assembly comprising the lamp and the lamp control device.

BACKGROUND

The lamp control device described in Japanese Patent Publication No. 2017-154735A controls lighting operations of a headlamp and a marker lamp adapted to be mounted on a vehicle. Specifically, the lamp control device includes a first lamp driving circuit, a second lamp driving circuit, and a switching circuit. The first lamp driving circuit supplies a first current. The second lamp driving circuit supplies a second current. The switching circuit switches supply paths of the first current and the second current for the headlamp and the marker lamp. When only the marker lamp is turned on, the first current is supplied. When the headlamp and the marker lamp are turned on, the first current is supplied to the headlamp and the second current is supplied to the marker lamp.

SUMMARY

It is demanded to enable a common lamp driving circuit to control the on/off operations of lamps of different types.

In order to meet the above demand; according to one aspect of the presently disclosed subject matter, there is provided a lamp control device adapted to be mounted on a vehicle, comprising:
 a lamp driving circuit configured to supply current;
 a switching circuit configured to selectively supply the current to either a first lamp or a second lamp that are of different types; and
 a processor configured to control the switching circuit such that a state in which the current is supplied to the first lamp and a state in which the current is supplied to the second lamp are repeated.

In order to meet the above demand, according to one aspect of the presently disclosed subject matter, there is provided a lamp assembly adapted to be mounted on a vehicle, comprising:
 a first lamp;
 a second lamp a type of which is different from the first lamp;
 a common lamp driving circuit configured to supply current;
 a switching circuit configured to selectively supply the current to either the first lamp or the second lamp; and
 a processor configured to control the switching circuit such that a state in which the current is supplied to the first lamp and a state in which the current is supplied to the second lamp are repeated.

Both the first lamp and the second lamp are not turned on simultaneously. However, by repeating the state in which either the first lamp or the second lamp is turned on at a relatively high speed, it appears to the human eye that the first lamp and the second lamp are turned on simultaneously. That is, the current supplied from the lamp driving circuit is shared by the first lamp and the second lamp in a time division manner. Therefore, the on/off operations of lamps of different types, such as the first lamp and the second lamp, can be controlled by a common lamp driving circuit. Specifically, a state in which lamps of different types are simultaneously turned on can be realized in a pseudo manner by a common lamp driving circuit.

For example, the above lamp assembly may be configured such that:
 the first lamp includes a low beam lamp and a high beam lamp; and
 the switching circuit is configured to selectively supply the current to at least one of the low beam lamp and the high beam lamp.

In this case, the above lamp assembly may be configured such that the second lamp is a marker lamp configured to be used as a daytime running lamp when the first lamp is turned off, and to be used as a position lamp when the first lamp is turned on.

The above lamp control device and the above lamp assembly may be configured such that one of a length of a time period during which the current is supplied to the first lamp and a length of a time period during which the current is supplied to the second lamp is variable.

With this configuration, the apparent brightness when each lamp is turned on can be changed as required.

The above lamp control device and the above lamp assembly may be configured such that when one of the length of the time period during which the current is supplied to the first lamp and the length of the time period during which the current is supplied to the second lamp is shortened, the other is extended.

With this configuration, it is possible to improve the utilization efficiency of the electric power supplied from the lamp driving circuit.

The expression "lamps of different types" as used herein with respect to lamps is intended to mean lamps associated with different lighting functions. For example, not only lamps having inherently different functions, such as the headlamp and the marker lamp, but also lamps having different lighting areas (such as a low beam lamp and a high beam lamp) even if the same headlamp is used, correspond to the "lamps of different types".

DESCRIPTION OF EMBODIMENTS

Examples of embodiments will be described below in detail with reference to the accompanying drawings. In each of the drawings used in the following description, the scale is appropriately changed in order to make each of the members have a recognizable size.

Figure 1:
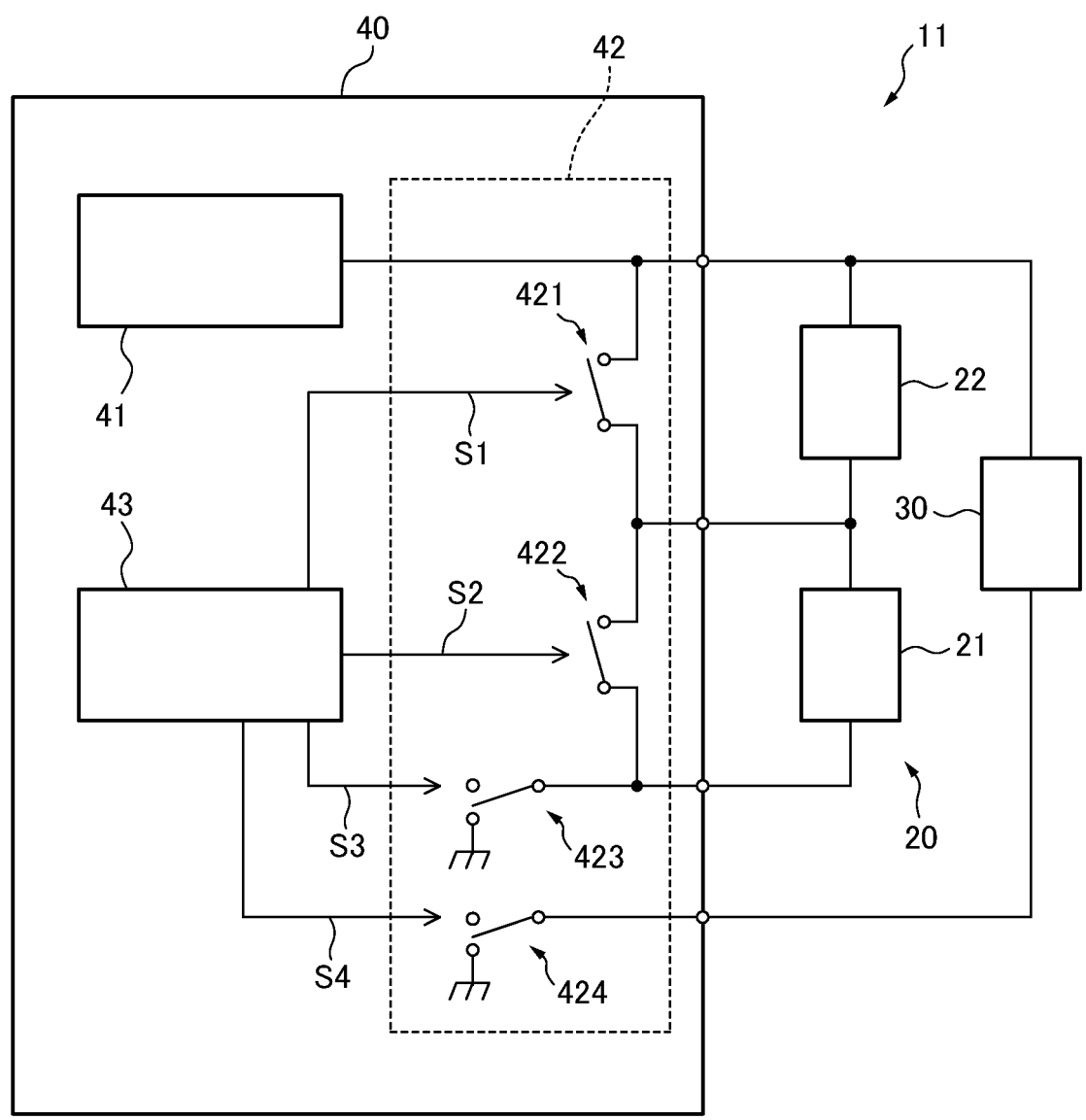
FIG. 1 illustrates a configuration of a lamp assembly according to a first embodiment.

FIG. 1 schematically illustrates a configuration of a lamp assembly 11 according to a first embodiment. The lamp assembly 11 is adapted to be mounted on a vehicle. The lamp assembly 11 includes a headlamp 20 and a marker lamp 30.

The headlamp 20 includes a low beam lamp 21 and a high beam lamp 22. The low beam lamp 21 illuminates a region including a road surface located at a relatively short distance ahead of the vehicle. The high beam lamp 22 is a lamp that supplies illumination light to a relatively long distance ahead of the vehicle. The low beam lamp 21 and the high beam lamp 22 are electrically connected in series. The headlamp 20 is an example of the first lamp.

The marker lamp 30 is a lamp which is used as a daytime running lamp (DRL) by being turned on when the headlamp 20 is turned off, and is used as a position lamp by being turned on together with the headlamp 20. The marker lamp 30 is an example of the second lamp.

Each of the low beam lamp 21, the high beam lamp 22, and the marker lamp 30 includes at least one light source. The light source may be a semiconductor light emitting element such as a light emitting diode (LED) or a laser diode (LD), or may be a lamp light source such as a halogen lamp or an HID lamp.

The lamp assembly 11 includes a lamp control device 40. The headlamp 20 and the marker lamp 30 are electrically connected to the lamp control device 40. The lamp control device 40 is a device for controlling on/off operations of each of the headlamp 20 and the marker lamp 30.

The lamp control device 40 includes a lamp driving circuit 41. The lamp driving circuit 41 is a circuit for supplying a current I for tuning on the headlamp 20 and the marker lamp 30. In other words, the headlamp 20 and the marker lamp 30 share the lamp driving circuit 41. The lamp driving circuit 41 may be implemented by, for example, a step-down constant-current switching regulator (DC/DC converter).

The lamp control device 40 includes a switching circuit 42. The switching circuit 42 is a circuit for selectively supplying the current I supplied from the lamp driving circuit 41 to either the headlamp 20 or the marker lamp 30.

Specifically, the switching circuit 42 includes a first switch 421, a second switch 422, a third switch 423, and a fourth switch 424. For example, each of the first switch 421, the second switch 422, the third switch 423, and the fourth switch 424 may be implemented as a semiconductor switch such as a field effect transistor.

The lamp control device 40 includes a processor 43. The processor 43 controls the operation of the switching circuit 42 to control the on/off operations of the headlamp 20 and the marker lamp 30. The processor 43 outputs a first control signal S1 for switching the open/close state of the first switch 421, a second control signal S2 for switching the open/close state of the second switch 422, a third control signal S3 for switching the open/close state of the third switch 423, and a fourth control signal S4 for switching the open/close state of the fourth switch 424. Each of the first control signal S1, the second control signal S2, the third control signal S3, and the fourth control signal S4 may be, for example; a signal for changing a control terminal voltage of a corresponding semiconductor switch.

The processor 43 may be implemented by dedicated integrated circuits such as a micro-controller, an ASIC, and an FPGA which are capable of executing programs for implementing operations described later. The processor 43 may be implemented by a general-purpose microprocessor capable of executing the program in cooperation with a general-purpose memory. Examples of the general-purpose microprocessor include a CPU and an MPU. Examples of the general-purpose memory include a ROM and a RAM.

Figure 2:
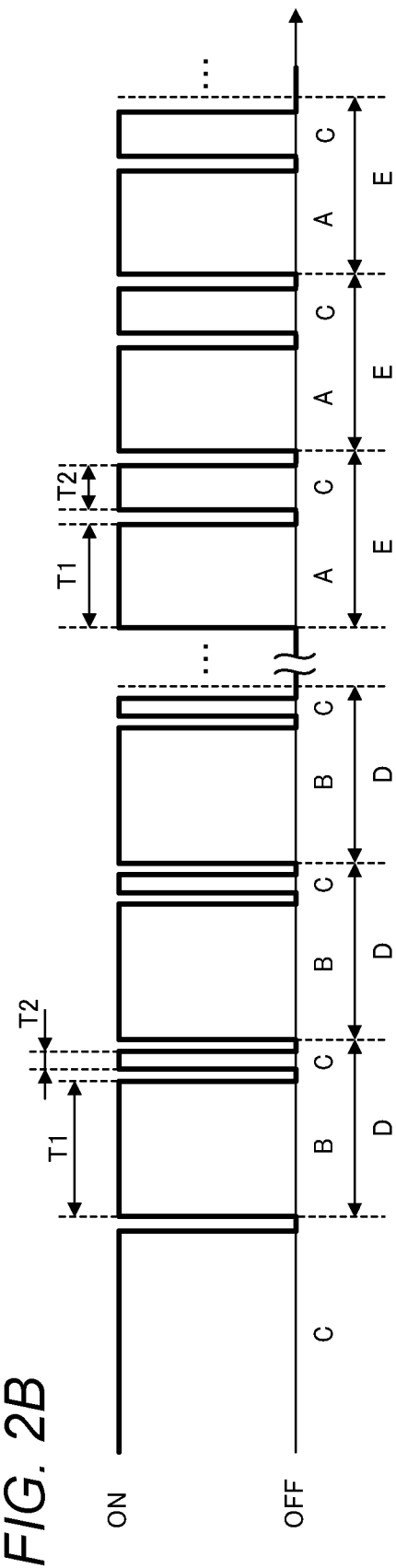
FIG. 2A illustrates an operation executed by the lamp assembly of FIG. 1.
FIG. 2B illustrates an operation executed by the lamp assembly of FIG. 1.

FIG. 2A illustrates the relationship between the lamp to be turned on and each of the first switch 421, the second switch 422, the third switch 423, and the fourth switch 424. The symbol ○ in the figure indicates a state in which the switch is closed, and the symbol X indicates a state in which the switch is opened.

The state A in the figure corresponds to a state in which the first switch 421 is closed, the second switch 422 is opened, the third switch 423 is closed, and the fourth switch 424 is opened. As a result, a path through which the current I is supplied from the lamp driving circuit 41 to the low beam lamp 21 by bypassing the high beam lamp 22 is formed. Since the fourth switch 424 is opened, the current I is not supplied to the marker lamp 30. As a result, only the low beam lamp 21 is turned on.

The state B in the figure corresponds to a state in which only the third switch 423 is closed and the other switches are opened. As a result, a path through which the current I is supplied from the lamp driving circuit 41 to both the low beam lamp 21 and the high beam lamp 22 is formed. Since the fourth switch 424 is opened, the current I is not supplied to the marker lamp 30. As a result, the low beam lamp 21 and the high beam lamp 22 are turned on, and the marker lamp 30 is turned off.

The state C in the figure corresponds to a state in which only the fourth switch 424 is closed and the other switches are opened. As a result, a path through which the current I is supplied from the lamp driving circuit 41 to the marker lamp 30 is formed. Since the third switch 423 is opened, the current I is not supplied to the headlamp 20. As a result, only the marker lamp 30 is turned on. The state C corresponds to a state in which the marker lamp 30 is used as a daytime running lamp.

Although illustration is omitted, when the switching circuit 42 is controlled such that the first switch 421 and the fourth switch 424 are opened and the second switch 422 and the third switch 423 are closed, a path for supplying the current I from the lamp driving circuit 41 to the high beam lamp 22 by bypassing the low beam lamp 21 can be formed. As a result, only the high beam lamp 22 is turned on. That is, the switching circuit 42 may be configured to selectively supply the current I supplied from the lamp driving circuit 41 to at least one of the low beam lamp 21 and the high beam lamp 22.

The processor 43 is configured to be able to control the switching circuit 42 so as to realize the state in FIG. 2A. Specifically, the switching circuit 42 is controlled so that the above-described states B and C are cyclically repeated. FIG. 2B illustrates an example in which the operating state realized by the processor 43 transitions from the state (state C) in which the marker lamp 30 is used as a daytime running lamp to the state D. This figure illustrates only the change over time of the on/off state of each lamp, and does not include information on the value of the current I supplied to each lamp.

The repetition frequency is preferably no less than 100 Hz, more preferably no less than 200 Hz. In this case, the state in which the current I from the lamp driving circuit 41 is supplied to the headlamp 20 and the state in which the current I from the lamp driving circuit 41 is supplied to the marker lamp 30 are repeated at a frequency corresponding to the repetition frequency. As a result, the state in which the headlamp 20 is turned on and the state in which the marker lamp 30 is turned on are repeated at a frequency corresponding to the repetition frequency. Both the headlight 20 and the marker lamp 30 are not turned on simultaneously. However, since the state in which either the headlamp 20 or the marker lamp 30 is turned on is repeated at a high speed, the headlamp 20 and the marker lamp 30 appear to the human eye to be turned on simultaneously. At this time, the marker lamp 30 is used as a position lamp.

That is, the current I supplied from the lamp driving circuit 41 is shared by the headlamp 20 and the marker lamp 30 in a time division manner. Therefore, the on/off operations of lamps of different types, such as the headlamp 20 and the marker lamp 30, can be controlled by the common lamp driving circuit 41. Specifically, a state in which lamps of different types are simultaneously turned on can be realized in a pseudo manner by the common lamp driving circuit 41.

In the state D, a state in which both the low beam lamp 21 and the high beam lamp 22 are turned on and a state in which the marker lamp 30 is turned on are alternately repeated. However, the processor 43 is configured to be able to control the switching circuit 42 so as to realize the state E in FIG. 2A. Specifically, as illustrated in FIG. 2B, the switching circuit 42 can be controlled so that the above-described states A and C are cyclically repeated. The repetition frequency is preferably no less than 100 Hz, more preferably no less than 200 Hz.

In this case, the state in which the current I from the lamp driving circuit 41 is supplied to the low beam lamp 21 and the state in which the current I from the lamp driving circuit 41 is supplied to the marker lamp 30 are repeated at a frequency corresponding to the repetition frequency. As a result, the state in which the low beam lamp 21 is turned on and the state in which the marker lamp 30 is turned on are repeated at a frequency corresponding to the repetition frequency. Both the low beam lamp 21 and the marker lamp 30 are not turned on simultaneously. However, since the state in which either the low beam lamp 21 or the marker lamp 30 is turned on is repeated at a high speed, it appears to the human eye that the low beam lamp 21 and the marker lamp 30 are turned on simultaneously. Also in this case, the marker lamp 30 is used as a position lamp.

At least one of the time period T1 during which the current I is supplied to the headlamp 20 and the time period T2 during which the current I is supplied to the marker lamp 30 may be variable. In the example illustrated in FIG. 2B, the length of time period T2 during which the current I is supplied to the marker lamp 30 differs between the states D and E. Under the condition that the value of the current is constant, the longer the time period during which the current is supplied, the greater the apparent brightness of the lamp. Thus, the apparent brightness of the marker lamp 30 is increased in the state E over the state D.

According to such a configuration, the apparent brightness when each lamp is turned on can be changed as required. For example, in the state E in which only the low beam lamp 21 is turned on, it is possible to perform control such that the apparent brightness of the marker lamp 30 is increased compared to the state D in which both the low beam lamp 21 and the high beam lamp 22 are turned on.

When one of the length of the time period T1 for supplying current I to the headlamp 20 and the length of the time period T2 for supplying current I to the marker lamp 30 is shortened, the length of the other can be controlled to be extended. In the example illustrated in FIG. 2B, the time period T2 for supplying the current I to the marker lamp 30 in the state E is made longer than the time period T2 for supplying the current I to the marker lamp 30 in the state D, whereas the time period T1 for supplying the current I to the headlamp 20 in the state E is made shorter than the time period T1 for supplying the current I to the headlamp 20 in the state D.

According to such a configuration, it is possible to improve the utilization efficiency of the electric power supplied from the lamp driving circuit 41. It is preferable that the length of time period during which both the headlamp 20 and the marker lamp 30 are turned off within one cycle is as short as possible.

However, in the case where one of the time period T1 during which the current I is supplied to the headlamp 20 and the time period T2 during which the current I is supplied to the marker lamp 30 is changed, the length of the other may be fixed.

Although illustration is omitted, the processor 43 can also realize an operation wherein the state in which only the high beam lamp 22 is turned on and the state in which only the marker lamp 30 is turned on are alternately repeated.

Figure 3:
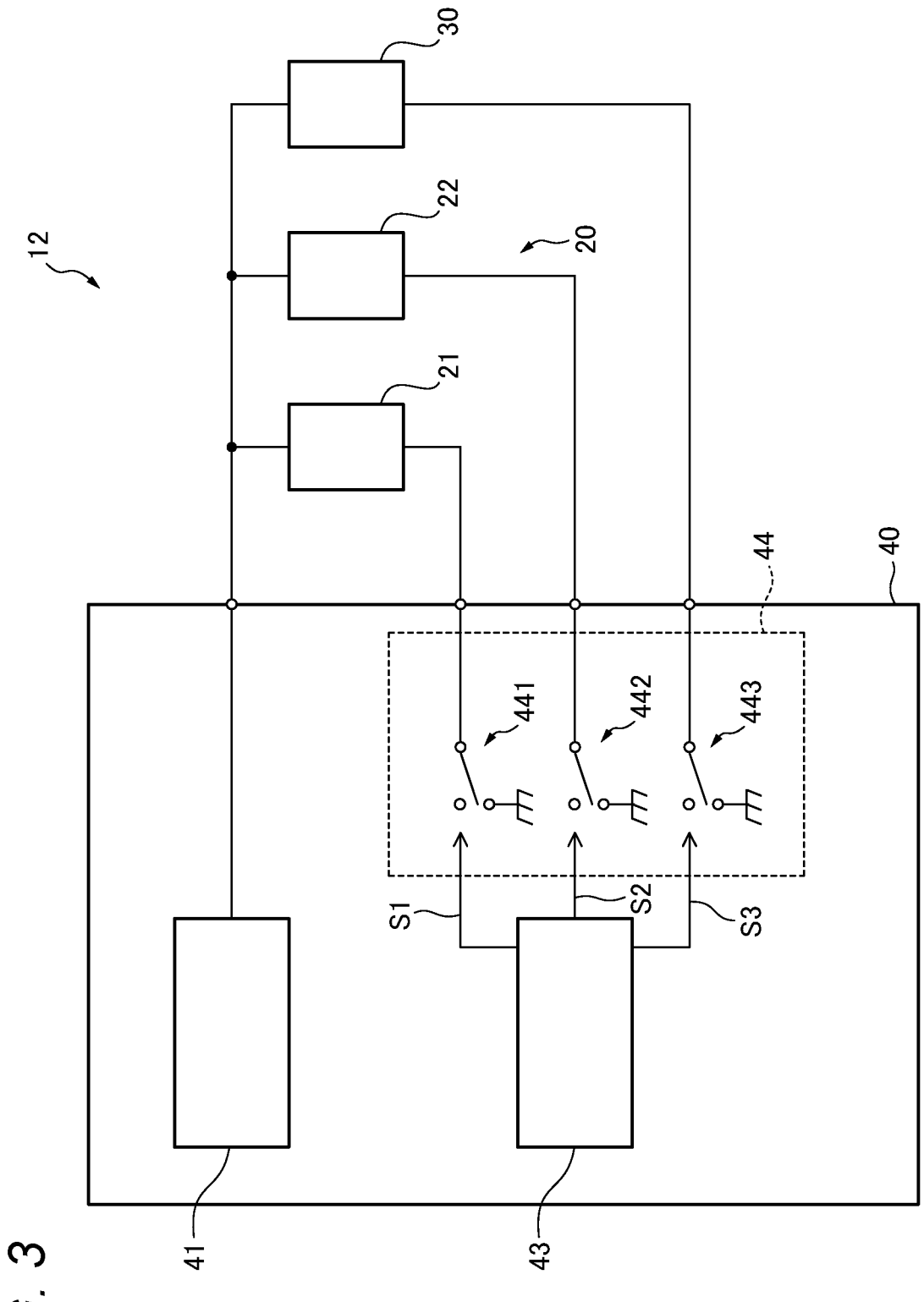
FIG. 3 illustrates a configuration of a lamp assembly according to a second embodiment.

FIG. 3 schematically illustrates a configuration of a lamp assembly 12 according to a second embodiment. Components substantially the same as those of the lamp assembly 11 according to the first embodiment are assigned with the same reference numerals, and repetitive descriptions for those will be omitted.

In the lamp assembly 12, the low beam lamp 21 and the high beam lamp 22 are connected in parallel to the lamp control device 40. The lamp control device 40 includes a switching circuit 44. The switching circuit 44 is a circuit for selectively supplying current I from lamp driving circuit 41 to either the low beam lamp 21, the high beam lamp 22, or the marker lamp 30.

Specifically, the switching circuit 44 includes a first switch 441, a second switch 442, and a third switch 443. For example, each of the first switch 441, the second switch 442, and the third switch 443 may be implemented as a semiconductor switch such as a field effect transistor.

Figures 4A, 4B:
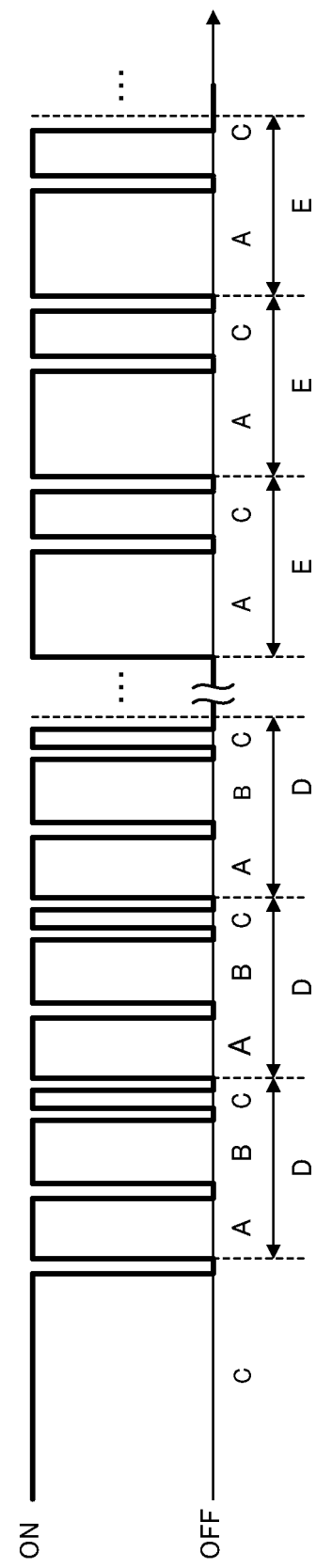
FIG. 4A illustrates an operation executed by the lamp assembly of FIG. 3.
FIG. 4B illustrates an operation executed by the lamp assembly of FIG. 3.

FIG. 4A illustrates the relationship between the lamp to be turned on and each of the first switch 441, the second switch 442, and the third switch 443. The symbol ○ in the figure indicates a state in which the switch is closed, and the symbol X indicates a state in which the switch is opened.

The state A in the figure corresponds to a state in which only the first switch 441 is closed and the other switches are opened. As a result, a path through which the current I is supplied from the lamp driving circuit 41 to the low beam lamp 21 is formed. Since the second switch 442 and the third switch 443 are opened, the current I is not supplied to the high beam lamp 22 and the marker lamp 30. As a result, only the low beam lamp 21 is turned on.

The state B in the figure corresponds to a state in which only the second switch 442 is closed and the other switches are opened. As a result, a path through which the current I is supplied from the lamp driving circuit 41 to the high beam lamp 22 is formed. Since the first switch 441 and the third switch 443 are opened, the current I is not supplied to the low beam lamp 21 and the marker lamp 30. As a result, only the high beam lamp 22 is turned on.

The state C in the figure corresponds to a state in which only the third switch 443 is closed and the other switches are opened. As a result, a path through which the current I is supplied from the lamp driving circuit 41 to the marker lamp 30 is formed. Since the first switch 441 and the second switch 442 are opened, the current I is not supplied to the low beam lamp 21 and the high beam lamp 22. As a result, only the marker lamp 30 is turned on. The state C corresponds to a state in which the marker lamp 30 is used as a daytime running lamp.

The processor 43 is configured to be able to control the switching circuit 44 so as to realize the state in FIG. 4A. Specifically, the switching circuit 44 is controlled so that the above-described states A, B, and C are cyclically repeated in this order. FIG. 4B illustrates an example in which the operating state realized by the processor 43 transitions from the state (state C) in which the marker lamp 30 is used as a daytime running lamp to the state D. This figure illustrates only the change over time of the on/off state of each lamp, and does not include information on the value of the current I supplied to each lamp.

The repetition frequency is preferably no less than 100 Hz, more preferably no less than 200 Hz. In this case, the current I from the lamp driving circuit 41 is first supplied to the low beam lamp 21, then to the high beam lamp 22, and finally to the marker lamp 30. This series of operations is repeated at a frequency corresponding to the repetition frequency. As a result, a series of operations in which the low beam lamp 21 is turned on, the high beam lamp 22 is then turned on, and finally the marker lamp 30 is turned on are repeated at a frequency corresponding to the repetition frequency. At least two of the low beam lamp 21, the high beam lamp 22, and the marker lamp 30 are not turned on simultaneously. However, since the state in which any of the low beam lamp 21, the high beam lamp 22, and the marker lamp 30 is turned on is repeated at high speed, the low beam lamp 21, the high beam lamp 22, and the marker lamp 30 appear to the human eye to be turned on simultaneously. At this time, the marker lamp 30 is used as a position lamp.

That is, the current I supplied from the lamp driving circuit 41 is shared in a time division manner by the low beam lamp 21, the high beam lamp 22, and the marker lamp 30. Therefore, the on/off operations of lamps of different types, such as the low beam lamp 21, the high beam lamp 22, and the marker lamp 30, can be controlled by the common lamp driving circuit 41. Specifically, a state in which lamps of different types are simultaneously turned on can be realized in a pseudo manner by the common lamp driving circuit 41.

As long as a series of lighting operations are repeated in the same order, the order in which the low beam lamp 21, the high beam lamp 22, and the marker lamp 30 are turned on in one cycle may be changed as appropriate.

In the state D, the low beam lamp 21, the high beam lamp 22, and the marker lamp 30 are all subjected to repeated lighting operations. However, the processor 43 is configured to be able to control the switching circuit 44 so as to realize the state E in FIG. 4A. Specifically, as illustrated in FIG. 4B, the switching circuit 44 can be controlled so that the above-described states A and C are cyclically repeated. The repetition frequency is preferably no less than 100 Hz, more preferably no less than 200 Hz.

In this case, the state in which the current I from the lamp driving circuit 41 is supplied to the low beam lamp 21 and the state in which the current I from the lamp driving circuit 41 is supplied to the marker lamp 30 are repeated at a frequency corresponding to the repetition frequency. As a result, the state in which the low beam lamp 21 is turned on and the state in which the marker lamp 30 is turned on are repeated at a frequency corresponding to the repetition frequency. Both the low beam lamp 21 and the marker lamp 30 are not turned on simultaneously. However, since the state in which either the low beam lamp 21 or the marker lamp 30 is turned on is repeated at a high speed, it appears to the human eye that the low beam lamp 21 and the marker lamp 30 are turned on simultaneously. Also in this case, the marker lamp 30 is used as a position lamp.

At least one of the time period during which the current I is supplied to the headlamp 20 and the time period during which the current I is supplied to the marker lamp 30 may be variable. In the example illustrated in FIG. 4B, the length of time period during which the current I is supplied to the marker lamp 30 differs between the states D and E. Under the condition that the value of the current is constant, the longer the time period during which the current is supplied, the greater the apparent brightness of the lamp. Thus, the apparent brightness of the marker lamp 30 is increased in the state E over the state D.

According to such a configuration, the apparent brightness when each lamp is turned on can be changed as required. For example, in the state E in which only the low beam lamp 21 is turned on, it is possible to perform control such that the apparent brightness of the marker lamp 30 is increased compared to the state D in which both the low beam lamp 21 and the high beam lamp 22 are turned on.

As long as the length of any of the time period during which the current I is supplied to the low beam lamp 21, the time period during which the current I is supplied to the high beam lamp 22, and the time period during which the current I is supplied to the marker lamp 30 is shortened, at least one of the remaining two lengths of time periods can be controlled to be extended. In the example illustrated in FIG. 4B, the time period during which the current I is supplied to the marker lamp 30 in the state E is made longer than the time period during which the current I is supplied to the marker lamp 30 in the state D. Accordingly, the time period during which the current I is supplied to the headlamp 20 in the state E is made shorter than the time period during which the current I is supplied to the headlamp 20 in the state D. On the other hand, since the high beam lamp 22 is not turned on in the state E, the time period during which the current I is supplied to the low beam lamp 21 is made longer than the time period during which the current I is supplied to the low beam lamp 21 in the state D.

According to such a configuration, it is possible to improve the utilization efficiency of the electric power supplied from the lamp driving circuit 41. It is preferable that the length of time period during which all of the low beam lamp 21, the high beam lamp 22, and the marker lamp 30 are turned off within one cycle is as short as possible.

However, in the case where any of the length of time period during which the current I is supplied to the low beam lamp 21, the length of time period during which the current I is supplied to the high beam lamp 22, and the length of time period during which the current I is supplied to the marker lamp 30 is changed, at least one of the remaining two lengths of time may be fixed.

Although illustration is omitted, the processor 43 can also realize an operation wherein the state in which the low beam lamp 21 is turned on and the state in which the high beam lamp 22 is turned on are alternately repeated. In this case, the low beam lamp 21 is an example of the first lamp, and the high beam lamp 22 is an example of the second lamp.

The above embodiments are merely illustrative to facilitate an understanding of the presently disclosed subject matter. The configuration according to each of the above embodiments can be appropriately changed or improved without departing from the gist of the presently disclosed subject matter.

In each of the above-described embodiments, the headlamp 20 and the marker lamp 30 share the lamp driving circuit 41 for supplying the current I in a time division manner. However, if it is necessary to realize a state in which the lamps are turned on simultaneously is a pseudo manner, a combination of a plurality of types of lamps used for time-division sharing of the lamp driving circuit 41 can be appropriately selected. Examples of such lamps include tail lamps and fog lamps. The marker lamp 30 is not limited to a daytime running lamp or a position lamp. An example of the marker lamp 30 may include a lamp for emitting light to inform the outside of the vehicle that a driving assistance operation is effective.

The invention claimed is:

1. A lamp control device adapted to be mounted on a vehicle, comprising:
   a lamp driving circuit configured to supply current;
   a switching circuit configured to selectively supply the current to either a first lamp or a second lamp that are of different types; and
   a processor configured to control the switching circuit such that a state in which the current is supplied to the first lamp and a state in which the current is supplied to the second lamp are repeated.

2. The lamp control device according to claim 1, wherein one of a length of a time period during which the current is supplied to the first lamp and a length of a time period during which the current is supplied to the second lamp is variable.

3. The lamp control device according to claim 2, wherein when one of the length of the time period during which the current is supplied to the first lamp and the length of the time period during which the current is supplied to the second lamp is shortened, the other is extended.

4. The lamp control device according to claim 1, wherein the processor is configured to control the switching circuit such that the state in which the current is supplied to the first lamp and the state in which the current is supplied to the second lamp are repeated at such frequency that the first lamp and the second lamp appear to a human eye to be turned on simultaneously.

5. A lamp assembly adapted to be mounted on a vehicle, comprising:
   a first lamp;
   a second lamp a type of which is different from the first lamp;
   a common lamp driving circuit configured to supply current;
   a switching circuit configured to selectively supply the current to either the first lamp or the second lamp; and
   a processor configured to control the switching circuit such that a state in which the current is supplied to the first lamp and a state in which the current is supplied to the second lamp are repeated.

6. The lamp assembly according to claim 5,
   wherein the first lamp includes a low beam lamp and a high beam lamp; and
   wherein the switching circuit is configured to selectively supply the current to at least one of the low beam lamp and the high beam lamp.

7. The lamp assembly according to claim 6,
   wherein the second lamp is a marker lamp configured to be used as a daytime running lamp when the first lamp is turned off, and to be used as a position lamp when the first lamp is turned on.

8. The lamp assembly according to claim 5,
   wherein one of a length of a time period during which the current is supplied to the first lamp and a length of a time period during which the current is supplied to the second lamp is variable.

9. The lamp assembly according to claim 8,
   wherein when one of the length of the time period during which the current is supplied to the first lamp and the length of the time period during which the current is supplied to the second lamp is shortened, the other is extended.

10. The lamp assembly according to claim 5, wherein the processor is configured to control the switching circuit such that the state in which the current is supplied to the first lamp and the state in which the current is supplied to the second lamp are repeated at such frequency that the first lamp and the second lamp appear to a human eye to be turned on simultaneously.

* * * * *